Aug. 27, 1968  R. L. GOLDEN ET AL  3,398,585
CONTROL SYSTEM AND PARTS THEREFOR OR THE LIKE
Filed Feb. 10, 1966  4 Sheets-Sheet 1
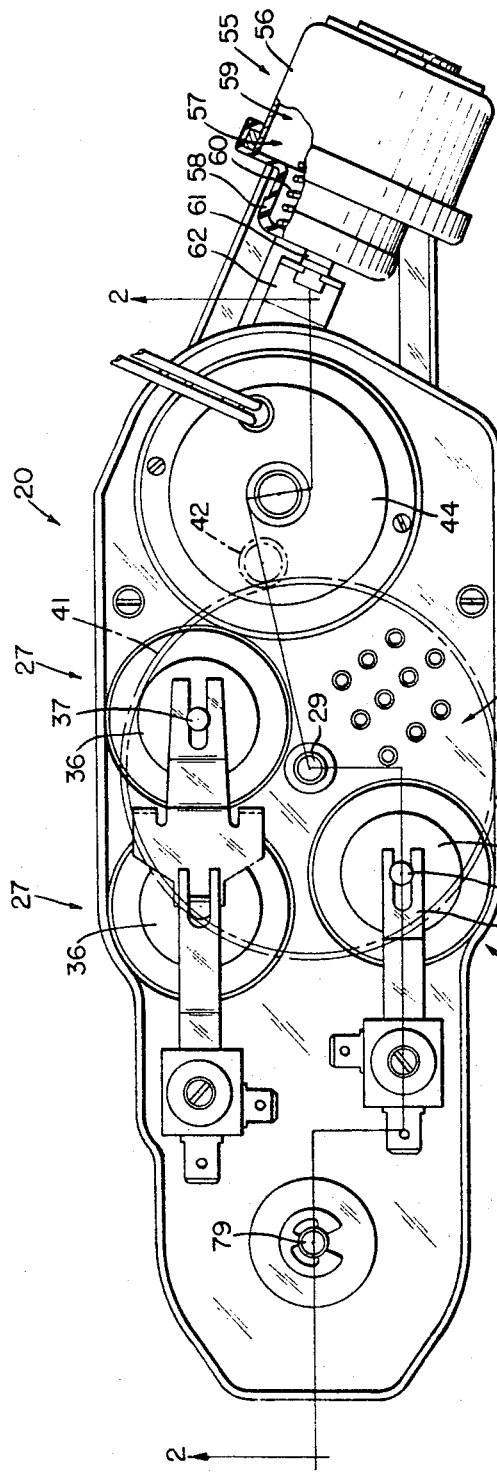
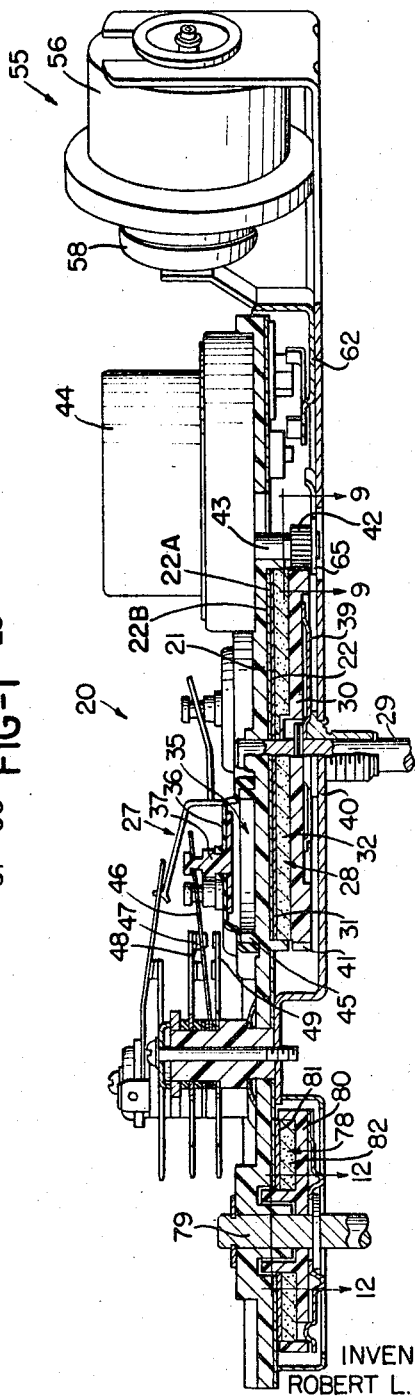
INVENTORS.
ROBERT L. GOLDEN
HARVEY J. SHOPSKY
BY *Caudor & Caudor*
THEIR ATTORNEYS

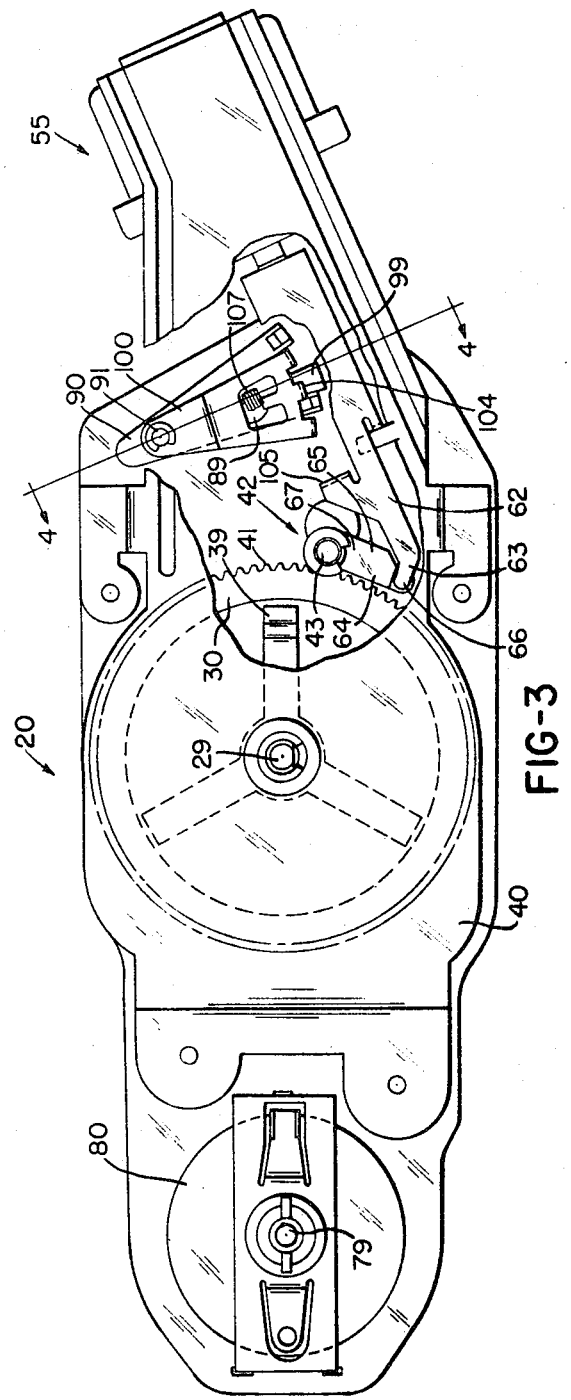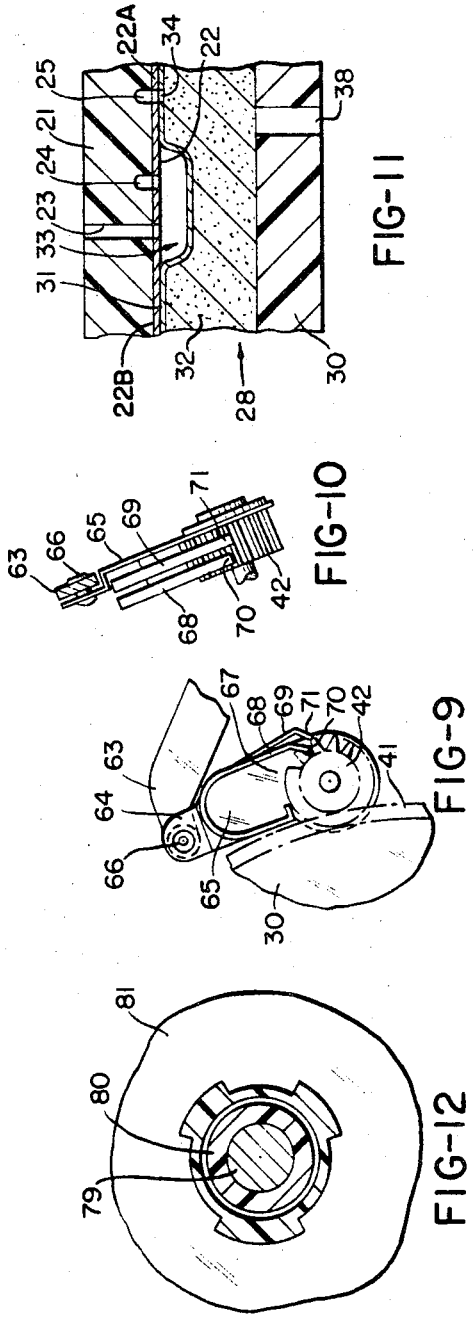

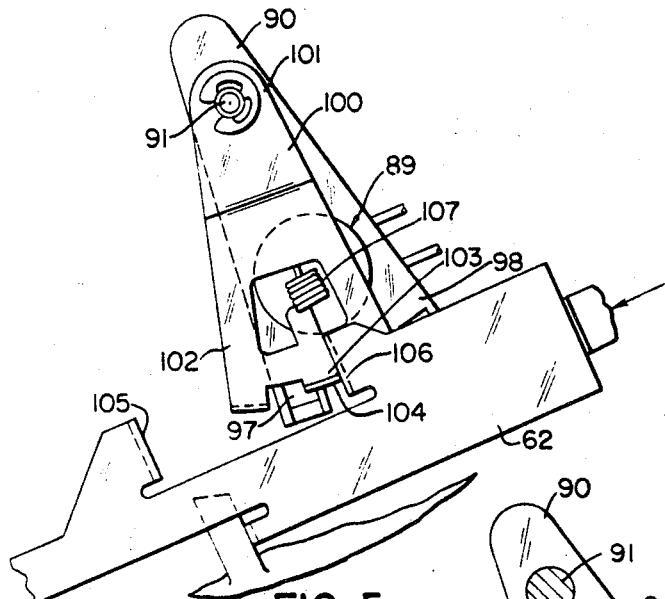
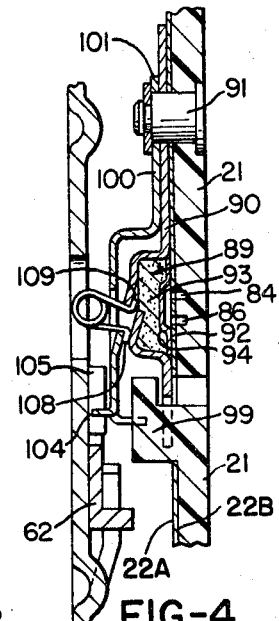
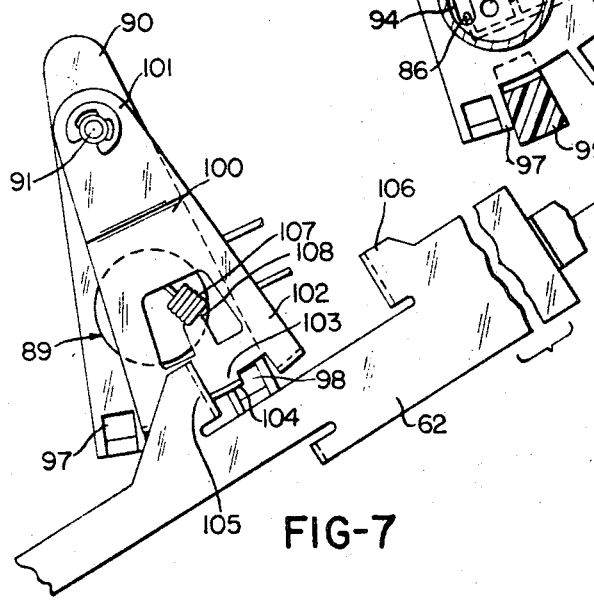
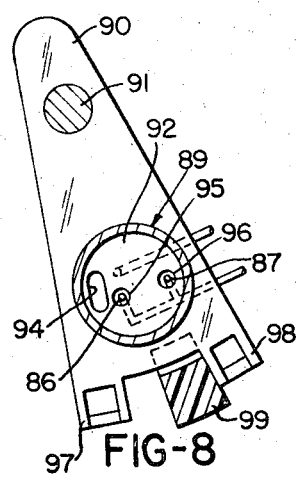

United States Patent Office 3,398,585
Patented Aug. 27, 1968

3,398,585
CONTROL SYSTEM AND PARTS THEREFOR
OR THE LIKE
Robert L. Golden, Greensburg, and Harvey J. Shopsky, Latrobe, Pa., assignors to Robertshaw Controls Company, Richmond, Va., a corporation of Delaware
Filed Feb. 10, 1966, Ser. No. 526,482
12 Claims. (Cl. 74—3.54)

ABSTRACT OF THE DISCLOSURE

This disclosure relates to a pneumatically controlled apparatus having a program member that is normally moved at a predetermined rate by a timer motor so as to sequentially interconnect and disconnect a pneumatic source to and from a plurality of pneumatically operated actuators to control the cycle of operation of the apparatus, the pneumatic control system including a pneumatically operated overriding actuator that will rapidly move the program member at a rate faster than the rate of the timer motor when the overriding actuator is alternately actuated and deactuated. The overriding actuator means is interconnected to a valve means to move the valve means in such a manner that the movement of the valve means itself interconnects and disconnects the pneumatic source to and from the pneumatically operated overriding actuator means to cause the overriding movement thereof.

---

This invention relates to an improved control system for operating a plurality of actuators in a predetermined pattern to complete a cycle of operation of a domestic appliance or the like.

In particular, a control system is provided wherein a plurality of actuators are actuated in a predetermined pattern by the movement of a program member under the control of a timer motor or the like. However, the particular cycle of operation of the program member can be selectively changed by an overriding means of this invention which will rapidly move the program member independently of the timer motor to shorten certain cycles of operation of the system or to eliminate such portion of the cycle as desired, the operation of the overriding means being selectively controlled and being under the influence of the main program member.

Accordingly, it is an object of this invention to provide an improved control system having one or more of the novel features set forth above or hereinafter shown or described.

Another object of this invention is to provide improved parts of such a control system or the like.

Other objects, uses and advantages of this invention are apparent from a reading of this description which proceeds with reference to the accompanying drawings forming a part thereof and wherein:

FIGURE 1 is a top view of the improved program means of this invention.

FIGURE 2 is a cross-sectional view taken on line 2—2 of FIGURE 1.

FIGURE 3 is a partially broken away bottom view of the program means illustrated in FIGURE 1.

FIGURE 4 is an enlarged, fragmentary, cross-sectional view taken on line 4—4 of FIGURE 3.

FIGURE 5 is a fragmentary, enlarged view illustrating one position of the operation of the valve means of FIGURE 3.

FIGURE 6 is a schematic view similar to FIGURE 5 and illustrates the valve member in its one position illustrated in FIGURE 5.

FIGURE 7 is a view similar to FIGURE 5 and illustrates the valve means in another operating position thereof.

FIGURE 8 is a view similar to FIGURE 6 and illustrates the structure illustrated in FIGURE 7.

FIGURE 9 is a fragmentary view of the rapid advance mechanism and is taken on line 9—9 of FIGURE 2.

FIGURE 10 is a fragmentary side elevation of the structure illustrated in FIGURE 9.

FIGURE 11 is a fragmentary, enlarged, cross-sectional view taken through the main program member of this invention.

FIGURE 12 is an enlarged, fragmentary, cross-sectional view taken on line 12—12 of FIGURE 2.

Figure 13:
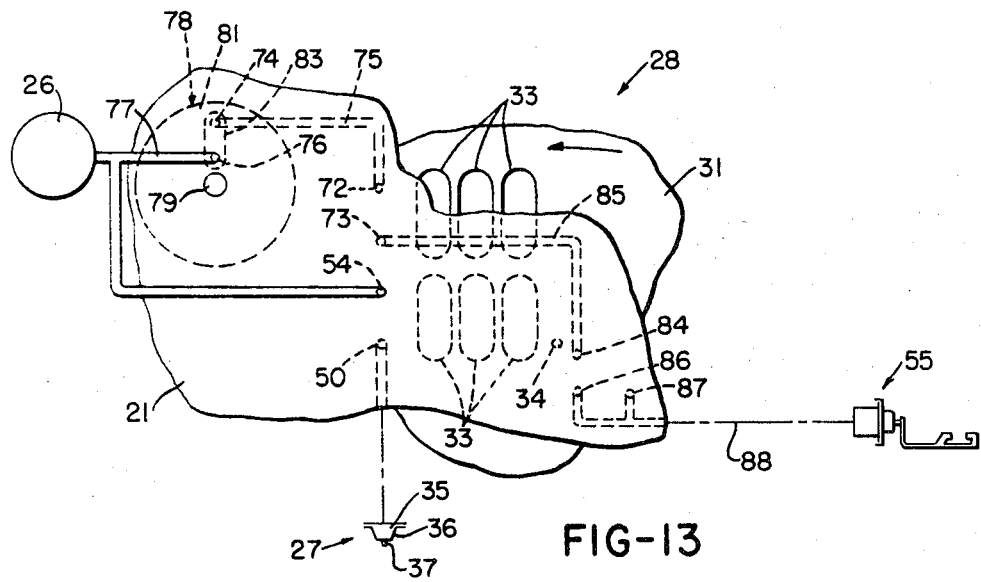
FIGURE 13 is a schematic view illustrating the improved control system of this invention.

While the various features of this invention are hereinafter illustrated and described as being particularly adaptable to provide a program control means for a domestic appliance or the like, it is to be understood that the various features of this invention can be utilized singly or in any combination thereof to provide a control system for other devices as desired.

Therefore, this invention is not to be limited to only the embodiments illustrated in the drawings, because the drawings are merely utilized to illustrate one of the wide variety of uses of this invention.

Referring now to FIGURES 1–3, an improved program means of this invention is generally indicated by the reference numeral 20 and is utilized to control the operation of a dishwasher, washing machine or the like in a manner hereinafter to be described, the program means 20 comprising a plastic base 21 having a flat lower surface 22, the flat surface 22 of the base means 21 being defined by a sheet of flexible tape means 22A having a pressure sensitive adhesive side thereof secured to the surface 22B of the base means 21.

In particular, the tape means 22A functions in the same manner as the reading head tape means disclosed and claimed in the copending patent application, Serial Number 262,885, filed March 5, 1963, now Patent Number 3,284,580, the purpose of the tape means 22A being more fully described hereinafter.

As illustrated in FIGURE 11 it can be seen that the base 21 has the surface 22 thereof interrupted by a plurality of ports 23, 24 and 25, etc., with certain of the ports being adapted to be interconnected to the inlet of a vacuum pump 26, FIGURE 13, while certain of the other ports are adapted to be interconnected to the chambers of vacuum operated actuator means 27, FIGURE 13.

A rotatable program member 28 is provided and is mounted for rotation relative to the base 21 by a shaft means 29. The program member 28 includes a rigid backing member 30 suitably interconnected to a flexible reading sheet 31 so that the same rotate in unison, a porous compressible material 32 being disposed between the backing member 30 and the reading sheet 31 to tend to urge the reading sheet 31 into sealing engagement with the reading surface 22 of the reading head 21 as well as to provide an air filter means in a manner hereinafter described.

The flexible reading sheet 31 is provided with a plurality of blisters or indentations 33 in a predetermined pattern as well as a plurality of apertures 34 passing therethrough in a predetermined pattern.

As the program member 28 is rotated relative to the reading head 21 in a manner hereinafter described, it can be seen that the blisters 33 function in the manner illustrated in FIGURE 11 whereby the blisters 33 are adapted to interconnect together two ports, such as ports 23 and 24 in the reading head 21. In this manner, if the port 23 is interconnected to the vacuum source 26 and the port 24 is interconnected to the actuator means 27, the actuator means 27 has the chamber 35 thereof evacuated to pull upwardly on the flexible diaphragm 36 thereof and actuate a suitable switch or the like by interconnecting means 37.

When an aperture means 34 of the reading sheet 31 passes over a port means, such as port means 25 in FIGURE 11, and the port means 25 is interconnected to an actuator means 27, air is adapted to return to the chamber 35 of the particular actuator means 27 by passing through an aperture means 38 in the backing member 30 and through the porous compressible material 32 and the aligned aperture means 34 and port means 25 to the chamber 35 of the actuator means 27 to deactuate the same, the air being filtered by the material 32 before passing into the port 25 to prevent passage clogging and the like.

Therefore, it can be seen that by arranging the blister means 33 and aperture means 34 in a predetermined pattern on the reading sheet 31, rotation of the program member 28 relative to the reading head 21 can operate a plurality of actuator means 27 in a predetermined pattern so that the actuator means 27 can control the operation of the domestic appliance to provide the desired cycles of operation thereof.

The backing member 30 of the main program member 28 is urged toward the reading head 21 by a spider-like spring means 39 disposed between the backing member 30 and a bracket means 40 carried by the base means 21.

The backing member 30 of the main program member 28 has a ring gear means 41 at the outer periphery thereof which is disposed in meshing relation with a pinion gear means 42 carried on an output shaft 43 of an electrical timer motor 44 carried by the base means 21, the shaft 43 being interconnected to the mechanism of the timer motor 44 by suitable clutch means so that the shaft means 43 can be rotated independently of the operation of the timer motor 44 in a manner hereinafter described.

If desired, certain of the actuator means 27 can be directly mounted on the base means 21 of the program means 20 in the manner illustrated in FIGURE 2.

In particular, the flexible diaphragm 36 can be snap fitted over an annular projection 45 extending from the base means 21 to cooperate therewith to provide the chamber 35. The interconnecting means 37 interconnected to the flexible diaphragm 36 can be interconnected to a switch blade 46 which will be held in the position illustrated in FIGURE 2 when the chamber 35 is at atmospheric conditions to place an electrical contact 47 into contact with a stationary contact 48. However, when the vacuum source 26 is interconnected to the chamber 35, the diaphragm 36 is pulled downwardly whereby the switch blade 46 is pulled downwardly therewith to break electrical contact between the contacts 47 and 48 and place the contact 47 into electrical contact with another fixed contact 49.

Figure 14:
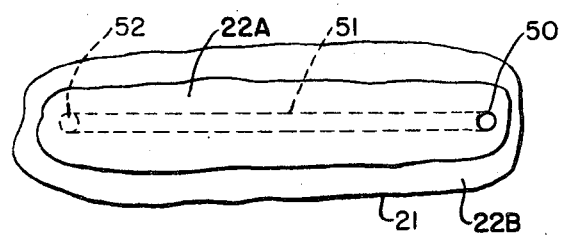
FIGURE 14 is a schematic view illustrating how various ports in the program means of FIGURE 1 are interconnected together.

If desired, the chamber 35 of the actuator 27 illustrated in FIGURE 2 can be interconnected to a port 50 of the main reading head 21 by means of a groove 51, FIGURE 14, formed in the surface 22B of the base means 21 and leading to a port 52 in the base means 21 leading to the chamber 35, the groove means 51 and port 52 being covered with the tape 22A while the port 50 passes completely through the tape 22A in the manner fully disclosed and claimed in the aforementioned copending patent application.

Therefore, it can be seen from FIGURE 13 that when the series of blister means 33 pass over the aligned ports 50 and 54 in the reading head 21, the same are adapted to interconnect the vacuum source 26 to the chamber 35 of the actuator 27 to actuate the same. However, when an aperture means 34 passes over the port 50, the actuator 27 can be deactuated in the manner previously described by permitting air to return to the chamber 35 thereof.

Accordingly, it can be seen that the chambers 35 of the actuators 27 can be interconnected to the main program member 28 by means of ports and groove means in the base means 21 or can be interconnected to the ports of the reading head 21 by flexible conduit means as desired.

The means for overriding the movement of the timer motor 44 will now be described.

As illustrated in FIGURES 1-3, a vacuum operated overriding actuator 55 is provided and comprises a cup-shaped housing 56 having the open end 57 thereof closed by a flexible diaphragm 58 which cooperates therewith to define a chamber 59 in the actuator 55. The diaphragm 58 is normally urged to its deactuated position illustrated in FIGURE 1 by a compression spring means 60 disposed within the chamber 59.

The flexible diaphragm 58 carries a post 61 interconnected to and axially movable lever 62.

The lever 62 has the free end 63 thereof pivotally attached to one end 64 of a lever 65 by pivot pin means 66, the other end 67 of the lever 65 telescopically receiving the output shaft 43 of the motor 44 whereby the lever 65 is pivotally mounted on the shaft 43 of the motor 44.

The lever 65 carries a pair of resilient fingers 68 and 69 so constructed and arranged that the same have ends 70 and 71 adapted to mesh with the gear teeth of the pinion gear means 42 in the manner illustrated in FIGURE 9, the ends 70 and 71 of the fingers 68 and 69 being staggered relative to the teeth of the pinion gear means 42 so that drive engagement occurs every half tooth of the pinion gear means 42 as the lever 65 is rotated in a manner hereinafter described to reduce lost motion on the actuator stroke hereinafter described.

Therefore, it can be seen that as the chamber 59 of the overriding actuator means 55 is being evacuated by being interconnected to the vacuum source 26 in a manner hereinafter described, the flexible diaphragm 58 of the actuator 55 will move to the right in the drawings and pull the lever 62 therewith whereby the lever 65 in FIGURE 3 will be moved in a counterclockwise direction to cause the spring fingers 68 and 69 thereof to rotate the pinion gear 42 in a counterclockwise direction in FIGURE 3 and thus, rotate the main program member 28 in a clockwise direction in FIGURE 3. This movement of the pinion gear means 42 by the actuator 55 is such that the same moves the program member 28 at a rate faster than the timer motor 44 was moving the same so that the program member 28 can reduce the time of actuation of particular actuator means 27 or completely skip portions of the normal program of the program member 28 as desired depending upon the arrangement of the blister means 33 and aperture means 34 as well as to the speed of rapid advancement of the program member 28.

When the actuator 55 is again interconnected to the atmosphere in a manner hereinafter described, the flexible diaphragm 58 moves back to the left in the drawings under the force of the compression spring 60 whereby the lever 62 returns to the left and moves the lever 65 in a clockwise direction in FIGURE 3 about the output shaft 43 of the timer motor 44, the spring fingers 68 and 69 merely ratcheting over the teeth of the pinion gear means 42 during such movement so that the same will not cause reverse rotation of the program member 28 during the deactuation of the overriding actuator means 55.

The control of the operation of the actuator 55 will now be described.

As illustrated in FIGURE 13, the reading head 21 has a pair of ports 72 and 73 adapted to be bridged by a series of blister means 33 to control the rapid advance of the program member 28. In particular, the port 72 of the main reading head 21 is interconnected to a port 74 on the base means 21 remote from the main program member 28 by groove means 75 formed in the surface 22B of the base 21 and covered by the sheet of tape 22A. Another port 76 in the base means 21 is disposed adjacent the port 74 and is interconnected to the inlet of the vacuum pump 26 by a conduit means 77.

A selector valve 78 is provided and is rotatably mounted to the base means 21 by a manually operated shaft 79, the selector valve 78 also including a rigid backing member 80 interconnected to a flexible reading sheet 81 to rotate in unison therewith and being spaced therefrom by a porous compressible material 82. The reading sheet 81 of the selector program member 78 has blister means 83 formed therein in the same manner as the blister means 33 of the main program member 28.

Thus, the operator of the program means 20 of this invention can set the selector programmer 78 in the position illustrated in FIGURE 13 to fluidly interconnect the ports 74 and 76 thereof by the blister means 83 if the overriding actuator means 55 is to be utilized. However, if the overriding actuator means 55 is not to be utilized during a particular cycle of operation of the main program member 28, the selector programmer 78 is moved to such a position that the blister means 83 thereof do not fluidly interconnect the ports 74 and 76 together.

However, when the ports 74 and 76 are interconnected together by the blister means 83 of the selector programmer 78, the vacuum source 26 is interconnected to the port 72 adjacent the main program member 28.

The adjacent port 73 of the main program means is interconnected to a port 84 formed on the program means 21 remote from the main program member 28 by a groove means 85 formed in the surface 22B of the base means 21 and covered by the tape 22A. A pair of ports 86 and 87 are formed adjacent the port 84 in the manner illustrated in FIGURE 13 and are interconnected to the chamber 59 of the overriding actuator means 55 by flexible conduit means 88 or the like.

A movable valve member 89 is provided and comprises a rigid backing member 90, FIGURE 4, pivotally mounted to the base means 21 by a pivot pin means 91. The rigid backing member 90 carries a flexible reading sheet 92 to move in unison therewith and being separated therefrom by a porous compressible material 93. As illustrated in FIGURES 6 and 8, the flexible reading sheet 92 of the valve means 89 has a blister 94 provided therein similar to the blister means 33 previously described so that when the valve member 89 is disposed in the position illustrated in FIGURE 6, the ports 84 and 86 are interconnected together. The reading sheet 92 also has a pair of aperture means 95 and 96 passing therethrough so that when the valve means 89 is disposed in the position illustrated in FIGURE 8, the aperture means 95 and 96 are respectively aligned with the ports 86 and 87 so that atmosphere can return to the chamber 59 of the actuator means 55.

The backing member 90 of the valve member 89 has a pair of spaced legs 97 and 98 straddling a stop member 99 formed on the base means 21 so that movement of the valve member 89 to the right in FIGURE 6 is limited by the leg 97 and movement of the valve member 89 to the left in the manner of FIGURE 8 is limited by the leg 98 abutting the stop member 99.

Another lever 100 is provided and has one end 101 pivotally mounted to the pin means 91 which pivotally mounts the valve member 89 to the base means 21. The other end 102 of the lever 100 has a leg 103 provided with a tang 104 engageable by opposed flanges 105 and 106 carried by the main lever 62 in a manner hereinafter described.

A snap-acting spring 107 interconnects together the lever 100 and the valve means 89 by having one end 108 interconnected to the lever 100 and the other end 109 interconnected to the backing member 90 of the valve means 89.

The spring 107 is so constructed and arranged that when the flange 106 of the main lever 62 engages the tang 104 on the lever 100 and moves the lever 100 in a clockwise direction as illustrated in FIGURE 5 with the valve member 89 being disposed in the position illustrated in FIGURE 8, movement of the spring 107 in a clockwise direction with the lever 100 cannot pull the valve member 89 in a clockwise direction therewith because of the stop tang 99 whereby the spring 107 is placed under compression. However, when the end 108 of the spring 107 is carried to the left in FIGURE 5 beyond the end 109 thereof, the compressed force stored in the spring 107 causes the valve member 89 to move from the position illustrated in FIGURE 8 to the position illustrated in FIGURE 6 with a snap action.

Conversely, with the valve member 89 disposed in the position illustrated in FIGURE 6 and the lever 62 is moving to the right whereby the flange 105 thereof engages the tang 104 of the lever 100 to move the same in a counterclockwise direction, the end 108 of the spring 107 is carried therewith but the end 109 of the spring 107 cannot move therewith because clockwise improvement of the valve member 89 is prevented by the stop tang 99 whereby when the spring 107 snaps over center, the same snaps the valve member 89 from the position illustrated in FIGURE 6 to the position illustrated in FIGURE 8.

Therefore, it can be seen that movement of the valve member 89 is controlled by movement of the lever 62 and, thus, by actuation and deactuation of the overriding actuator 55.

The operation of the system of this invention as illustrated schematically in FIGURE 13 as well as structurally in the other figures of the drawings will now be described.

Assuming that the operator desires to have a particular cycle of operation of the apparatus to include a rapid advancement of the main program member 28 during a portion of the cycle thereof, the operator adjusts the selector programmer 78 by means of a shaft 79 to a position thereof whereby a blister means 83 will interconnect the ports 74 and 76 together. The operator sets the main program member 28 to the desired beginning position thereof by means of the shaft 29 and causes actuation of the timer motor 44 and vacuum pump 26 by closing a suitable start switch or the like.

When the motor 44 and vacuum pump 26 are energized, the motor 44 through the output shaft 43 and pinion gear means 42 causes rotation of the main program member 28 relative to the base means 21 at a predetermined speed whereby the arrangement of blister means 33 and aperture means 34 of the main program member 28 causes actuation of the actuator means 27 in a predetermined pattern to accomplish the various cycles of operation of the washing machine, dishwasher or the like.

However, when a particular set of blister means 33 of the main program member 28 begin interconnecting together the ports 72 and 73, it can be seen that the vacuum source 26 is now interconnected to the port 84.

Since the actuator 55 is in its deactuated position, the lever 62 is in the position illustrated in FIGURE 5 whereby the lever 100 is to the left and the valve means 89 is in its right-hand position as illustrated in FIGURE 6. In this manner, the blister means 94 fluidly interconnects the ports 84 and 86 together while the port 87 is sealed from the atmosphere by the reading sheet 92. In this manner, the vacuum source 26 is now interconnected to the chamber 59 of the overriding actuator means 55 whereby the evacuation of the chamber 55 pulls the diaphragm 58 to the right and, thus, the lever 62 to the right from the position illustrated in FIGURE 5 to the position illustrated in FIGURE 7. As the lever 62 is moved from the position illustrated in FIGURE 5 to the position illustrated in FIGURE 7, the lever 65 is causing rapid advancement of the main program member 28 at a rate faster than would be accomplished by the timer motor 44.

When the lever 62 reaches the position illustrated in FIGURE 7, the valve member 89 is moved from the position illustrated in FIGURE 6 to the position illustrated in FIGURE 8 by a snap action in the manner previously described whereby the ports 84 and 86 are disconnected so that the vacuum source 26 is no longer interconnected to the actuator 55 and the atmosphere is interconnected to tthe chamber 59 of the actuator 55 by means of the apertures 95 and 96 of the reading sheet 92 aligned with the ports 86 and 87 whereby the spring means 60 causes the lever 62 to move back from the position illustrated in FIGURE 7 to the position illustrated in FIGURE 5 while the fingers 68 and 69 ratchet around the pinion gear means 42.

As the lever 62 moves back from the position illustrated in FIGURE 7 to the position illustrated in FIGURE 5, the lever 62 causes the valve member 89 to move from the position illustrated in FIGURE 8 back to the position illustrated in FIGURE 6 whereby the vacuum source 26 is again interconnected to the actuator 55 to cause the same to move the lever 62 from the position illustrated in FIGURE 5 back to the position illustrated in FIGURE 7 and, thus, cause further rapid advancement of the program member 28 by means of the lever 65.

Therefore, it can be seen that as long as the blister means 33 of the main program member 28 are interconnecting together the ports 72 and 73, the overriding actuator 55 is actuated and deactuated by the valve means 89 to cause rapid advancement of the program member 28.

Such rapid advancement of the program member 28 can be utilized to shorten the cycles of operation of particular actuator means 27 causing operating function in the apparatus or can be utilized to completely subtract the operation thereof as desired.

In any event, it can be seen that the overriding actuator means 55 controls its own valve member 89 for causing actuation and deactuation thereof while the main program member 28 in combination with the selector program member 78 determines when the overriding actuator means 55 is to be actuated during the rotation of the program member 28 under the influence of the timer motor 34.

Accordingly, it can be seen that this invention not only provides an improved control system having many unique and novel features, but also this invention provides improved parts for such a control system or the like.

While the form of the invention now preferred has been disclosed as required by the statutes, other forms may be used, all coming within the scope of the claims which follow.

What is claimed is:

1. In combination, actuator means, a movable program member for controlling the operation of said actuator means in a predetermined sequence, a first means for moving said program member at a predetermined rate, and overriding means for rapidly moving said program member at a rate faster than said first means, said overriding means being movable in two directions to provide overriding movement during movement of said overriding means in one direction and no overriding movement during movement of said overriding means in the other direction, and movable means separate from said program member and being operatively interconnected to said overriding means to be moved by the movement of said overriding means, said movable means itself causing said movement of said overriding means in said directions of movement thereof as sad movable means is being moved by said overriding means.

2. A combination as set forth in claim 1 wherein said program member cooperates with said last-named means to control movement of said overriding means.

3. A combination as set forth in claim 1 wherein a selector means is provided for determining when said overriding means is to be operated.

4. A combination as set forth in claim 1 and including a pneumatic source, said actuator means comprising pneumatically operated actuator means, said movable program member controlling the operation of said actuator means in a predetermined sequence by interconnecting and disconnecting said source to and from said actuator means, said overriding means comprising a pneumatically operated overriding means for rapidly moving said program member at a rate faster than said first means when, said overriding means is actuated, and said movable means when controlling the movement of said overriding means sequentially interconnecting and disconnecting said source to and from said overriding means to actuate said overriding means for rapid advancement of said program member.

5. A combination as set forth in claim 4 wherein said program member has means for interconnecting said source to said last-named means so that last-named means can operate said overriding means.

6. A combination as set forth in claim 5 wherein a selector valve means is provided for interconnecting said source to said program member for being interconnected to said last-named means.

7. A combination as set forth in claim 4 wherein said moveable means for controlling the movement of said overriding means comprises movable valve means moved by the movement of said overriding means to sequentially interconnect and disconnect said source to and from said overriding means to actuate said overriding means for rapid advancement of said program member.

8. A combination as set for in claim 7 wherein said valve means includes a reading head having a first port interconnected to said source and a second port interconnected to said overriding means, and a valve member movable over said reading head for interconnecting said ports when said valve member is in one position and for disconnecting said ports when said valve member is in another position thereof.

9. A combination as set forth in claim 8 wherein said valve member has means for connecting the atmosphere with said second port when said valve member is in said other position thereof.

10. A combination as set forth in claim 8 wherein snap-acting means are provided for moving said valve member with a snap action between said positions thereof.

11. A combination as set forth in claim 4 wherein said program member is rotatable and has ring gear means, a pinion means disposed in meshing relations with said ring gear means, said first means comprising a timer motor for rotating said pinion gear means at a predetermined rate to rotate said program member at a predetermined rate, said pneumatically operated overiding means rapidly rotating said pinion gear means at a rate faster than said timer motor when said overriding means is actuated.

12. A combination as set forth in claim 11 wherein a reading head is provided with a plurality of ports and wherein said program member has means for interconnecting certain of said ports together as said program member rotates.

References Cited

UNITED STATES PATENTS

| | | | |
|---|---|---|---|
| 1,093,292 | 4/1914 | Rieber | 200—46 X |
| 1,198,861 | 9/1916 | Lesley et al. | 200—46 |
| 1,379,654 | 5/1921 | Sommermyer | 200—46 |
| 3,216,326 | 9/1965 | Rice et al. | 137—624.18 |
| 3,233,059 | 2/1966 | Pridham et al. | 200—166 |
| 3,285,054 | 11/1966 | Heller et al. | 200—46 |
| 3,298,227 | 1/1967 | Hicks | 74—3.54 |
| 3,305,171 | 2/1967 | Phillips et al. | 200—46 |

FRED C. MATTERN, Jr., *Primary Examiner.*

W. S. RATLIFF, *Assistant Examiner.*